United States Patent
Chae et al.

(10) Patent No.: US 12,021,217 B2
(45) Date of Patent: Jun. 25, 2024

(54) METHOD OF MANUFACTURING NEGATIVE ELECTRODE FOR SECONDARY BATTERY

(71) Applicant: LG ENERGY SOLUTION, LTD., Seoul (KR)

(72) Inventors: Oh Byong Chae, Daejeon (KR); Sang Wook Woo, Daejeon (KR); Ye Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 484 days.

(21) Appl. No.: 17/292,236

(22) PCT Filed: Jan. 30, 2020

(86) PCT No.: PCT/KR2020/001440
§ 371 (c)(1),
(2) Date: May 7, 2021

(87) PCT Pub. No.: WO2020/159263
PCT Pub. Date: Aug. 6, 2020

(65) Prior Publication Data
US 2022/0006065 A1  Jan. 6, 2022

(30) Foreign Application Priority Data
Feb. 1, 2019  (KR) .......... 10-2019-0013407

(51) Int. Cl.
*H01M 4/04*  (2006.01)
*H01M 4/02*  (2006.01)
*H01M 4/38*  (2006.01)
*H01M 4/583*  (2010.01)

(52) U.S. Cl.
CPC ....... *H01M 4/0459* (2013.01); *H01M 4/0404* (2013.01); *H01M 4/386* (2013.01); *H01M 4/583* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 5,436,093 A | * | 7/1995 | Huang | H01M 4/96 205/59 |
| 2012/0105007 A1 | * | 5/2012 | Amiruddin | H01M 4/1395 29/623.5 |
| 2012/0251880 A1 | | 10/2012 | Utsunomiya | |
| 2013/0327648 A1 | * | 12/2013 | Grant | C25D 3/665 205/59 |
| 2014/0310951 A1 | | 10/2014 | Grant et al. | |
| 2016/0141596 A1 | | 5/2016 | Uhm et al. | |
| 2016/0351973 A1 | | 12/2016 | Albano et al. | |
| 2018/0040914 A1 | | 2/2018 | Grant et al. | |
| 2019/0036118 A1 | | 1/2019 | Ofer et al. | |
| 2019/0044130 A1 | * | 2/2019 | Ogata | H01M 4/366 |
| 2019/0252684 A1 | * | 8/2019 | Yang | H01M 4/0404 |
| 2020/0066459 A1 | | 2/2020 | Yokoshima et al. | |
| 2020/0235419 A1 | | 7/2020 | Chae et al. | |

FOREIGN PATENT DOCUMENTS

| | | |
|---|---|---|
| CN | 102738505 A | 10/2012 |
| EP | 3 863 086 A1 | 8/2021 |
| JP | 2016-511916 A | 4/2016 |
| KR | 10-1999-0086308 A | 12/1999 |
| KR | 10-0291067 B1 | 6/2001 |
| KR | 10-2015-0014676 A | 2/2015 |
| KR | 10-2015-0014877 A | 2/2015 |
| KR | 10-2018-0104174 A | 9/2018 |
| KR | 10-2019-0007296 A | 1/2019 |
| WO | WO 2018/155468 A1 | 8/2018 |
| WO | WO 2020/159263 A1 | 8/2020 |

OTHER PUBLICATIONS

Abe et al., "Effect of Prelithiation Process for Hard Carbon Negative Electrode on the Rate and Cycling Behaviors of Lithium-Ion Batteries", Batteries, 2018, vol. 4, No. 71, pp. 1-16.

(Continued)

*Primary Examiner* — Louis J Rufo
(74) *Attorney, Agent, or Firm* — Birch, Stewart, Kolasch & Birch, LLP

(57) ABSTRACT

A method of manufacturing a negative electrode for a secondary battery, which includes: forming a negative electrode structure including a negative electrode current collector and a negative electrode active material layer formed on a surface of the negative electrode current collector; providing a pre-lithiation solution in which a lithium metal counter electrode is immersed and immersing the negative electrode structure in the pre-lithiation solution so that the negative electrode structure is spaced apart from the lithium metal counter electrode; and subjecting the negative electrode structure to a pre-lithiation process, which includes an electrochemical charging process and an electrochemical discharging process performed after the electrochemical charging process, wherein a state of charge ($SOC_p$) of the negative electrode structure subjected to the pre-lithiation process is in a range of 5% to 50%.

10 Claims, No Drawings

(56) References Cited

OTHER PUBLICATIONS

Holtstiege et al., "Pre-Lithiation Strategies for Rechargeable Energy Storage Technologies: Concepts, Promises and Challenges", Batteries, 2018, vol. 4, No. 4, pp. 1-39.
International Search Report issued in PCT/KR2020/001440 (PCT/ISA/210), dated May 12, 2020.
Extended European Search Report for European Application No. 20747645.8, dated Nov. 8, 2021.
Li et al., "The design of a high-energy Li-ion battery using germanium-based anode and LiCoO2 cathode," Journal of Power Sources, vol. 293, 2015, pp. 868-875.

* cited by examiner

METHOD OF MANUFACTURING NEGATIVE ELECTRODE FOR SECONDARY BATTERY

CROSS-REFERENCE TO RELATED APPLICATION

This application claims priority to and the benefit of Korean Patent Application No. 10-2019-0013407, filed Feb. 1, 2019, the disclosure of which is incorporated herein by reference in its entirety.

TECHNICAL FIELD

Technical Field

The present invention relates to a method of manufacturing a negative electrode for a secondary battery.

Background Art

With the quick spread of electronic equipment using batteries, such as cellular phones, laptop computers, electric vehicles, and the like, there has been a soaring demand for small and lightweight secondary batteries with relatively high capacity. In particular, lithium secondary batteries have come into the spotlight as driving power sources for portable devices because the lithium secondary batteries are lightweight and have a high energy density. Therefore, research and development efforts are actively under way to improve the performance of the lithium secondary batteries.

In general, the lithium secondary battery includes a positive electrode, a negative electrode, a separator interposed between the positive electrode and the negative electrode, an electrolyte, an organic solvent, and the like. Also, the positive electrode and negative electrode may have an active material layer formed on a current collector, wherein the active material layer includes either a positive electrode active material or a negative electrode active material. In the positive electrode, a lithium-containing metal oxide such as $LiCoO_2$, $LiMn_2O_4$, or the like is generally used as the positive electrode active material. Therefore, a carbon-based material or a silicon-based material, which does not contain lithium, is used as the negative electrode active material in the negative electrode.

In the case of such a negative electrode, a passivation film such as a solid electrolyte interface layer (an SEI layer) is formed on a surface of the negative electrode during initial charging. In this case, because the passivation film prevents an organic solvent from being intercalated into the negative electrode and suppresses a decomposition reaction of the organic solvent, the passivation film serves to stabilize a structure of the negative electrode and improve reversibility of the negative electrode, and allows use as the negative electrode. However, because a formation reaction of the passivation film is an irreversible reaction, this results in consumption of lithium ions, thereby degrading the battery capacity. As the cycle of a battery is repeated, the consumption of lithium ions may occur, resulting in degraded capacity and reduced cycle lifespan.

Accordingly, a method of pre-lithiating a negative electrode to form a passivation film on a surface of a negative electrode in advance, prevent a loss in capacity and promote an improvement in cycle lifespan has been developed using a method of intercalating lithium into the negative electrode, and the like.

As the method of pre-lithiating a negative electrode, a physicochemical method of allowing a lithium metal to come into direct contact with a negative electrode to impregnate lithium into the negative electrode, an electrochemical method of charging a negative electrode by an electrochemical charger/discharger using a lithium metal as a counter electrode to impregnate lithium into the negative electrode, and the like are known.

However, the pre-lithiation using the conventional physicochemical method has drawbacks in that it is difficult to control an impregnation rate of lithium, and there are risks of fires, explosions, and the like since it should be performed at a high temperature. Also, the conventional electrochemical method is stable because it is performed at room temperature, but has a problem in that the cycle performance is poorly improved because it is difficult to sufficiently form a passivation film on the negative electrode.

Therefore, there is an urgent demand for development of a method of manufacturing a negative electrode capable of improving the cycle performance of the negative electrode through the pre-lithiation, in which a stable and hard passivation film may be sufficiently formed.

Korean Patent No. 10-0291067 discloses a method of pre-lithiating a carbon electrode and a method of manufacturing a lithium secondary battery using the same.

PRIOR-ART DOCUMENT

Patent Document

Korean Patent No. 10-0291067

DISCLOSURE

Technical Problem

An object of the present invention is to provide a method of manufacturing a negative electrode for a secondary battery capable of remarkably improving the cycle performance of a battery when a hard passivation film is sufficiently formed on the negative electrode using a pre-lithiation process including an electrochemical charging and discharging process.

Technical Solution

In one general aspect, a method of manufacturing a negative electrode for a secondary battery includes: forming a negative electrode structure including a negative electrode current collector and a negative electrode active material layer formed on a surface of the negative electrode current collector; providing a pre-lithiation solution in which a lithium metal counter electrode is immersed and immersing the negative electrode structure in the pre-lithiation solution so that the negative electrode structure is spaced apart from the lithium metal counter electrode; and subjecting the negative electrode structure to a pre-lithiation process, which includes an electrochemical charging process and an electrochemical discharging process performed after the electrochemical charging process, wherein a state of charge ($SOC_p$) of the negative electrode structure subjected to the pre-lithiation process is in a range of 5% to 50%.

Advantageous Effects

According to the method of manufacturing a negative electrode for a secondary battery according to the present invention, a process of electrochemically charging a negative electrode and electrochemically discharging the negative electrode is performed during pre-lithiation of the negative electrode. Therefore, the negative electrode may be subjected to charging and discharging to sufficiently remove the irreversible capacity, thereby firmly forming a passivation film. As a result, the cycle performance of the negative electrode or secondary battery manufactured by the method of manufacturing a negative electrode for a secondary battery according to the present invention may be improved to considerable extent.

MODE OF INVENTION

The terms or words used in this specification and the appended claims should not be construed as limited to general or dictionary meanings, but interpreted based on the meanings and concepts corresponding to technical aspects of the present invention on the basis of the principle that the inventors are allowed to define terms appropriately for the best explanation.

The terms used in this specification are merely used to explain exemplary embodiments, and are not intended to limit the present invention. The singular forms "a," "an" and "the" are intended to include the plural forms as well, unless the context clearly indicates otherwise.

It should be understood that the terms "comprising," "including" and/or "having," when used in this specification, specify the presence of stated features, integers, steps, elements and/or groups thereof, but do not preclude the presence or addition of one or more other features, integers, steps, elements and/or groups thereof.

In this specification, the term "average particle diameter ($D_{50}$)" may be defined as a particle diameter corresponding to 50% of the cumulative volume in a particle diameter distribution curve of particles. The average particle diameter ($D_{50}$) may, for example, be measured using a laser diffraction method. The laser diffraction method may generally measure a particle diameter ranging from a submicron region to approximately several millimeters (mm) and obtain the results of high reproducibility and high resolution.

Hereinafter, the present invention will be described in detail.

Method of Manufacturing Negative Electrode for Secondary Battery

The present invention relates to a method of manufacturing a negative electrode for a secondary battery, and more particularly, to a method of manufacturing a negative electrode for a lithium secondary battery.

The method of manufacturing a negative electrode for a secondary battery according to the present invention includes: forming a negative electrode structure including a negative electrode current collector and a negative electrode active material layer formed on the negative electrode current collector; immersing the negative electrode structure in a pre-lithiation solution in which a lithium metal counter electrode is immersed so that the negative electrode structure is spaced apart from the lithium metal counter electrode; and subjecting the negative electrode structure to a pre-lithiation process, which includes an electrochemical charging process and an electrochemical discharging process performed after the electrochemical charging process, wherein a state of charge ($SOC_p$) of the negative electrode structure subjected to the pre-lithiation process is in a range of 5% to 50%.

According to the method of manufacturing a negative electrode for a secondary battery according to the present invention, a pre-lithiation process including a process of electrochemically charging a negative electrode and electrochemically discharging the negative electrode is performed. Therefore, the negative electrode may be subjected to charging and discharging to remove the irreversible capacity to a comparable extent, thereby firmly forming a passivation film. As a result, since the negative electrode manufactured by the method of manufacturing a negative electrode for a secondary battery according to the present invention is merely subjected to the electrochemical charging, the cycle performance of the negative electrode may be improved to a comparable extent, compared to the conventional pre-lithiated negative electrodes.

The method of manufacturing a negative electrode for a secondary battery according to the present invention includes forming a negative electrode structure including a negative electrode current collector and a negative electrode active material layer formed on the negative electrode current collector.

The negative electrode current collector is not particularly limited as long as it has high conductivity without causing a chemical change in a battery. Specifically, copper, stainless steel, aluminum, nickel, titanium, baked carbon, copper or stainless steel whose surface has been treated with carbon, nickel, titanium, silver, and the like, an aluminum-cadmium alloy, and the like may be used as the negative electrode current collector.

The negative electrode current collector may typically have a thickness of 3 to 500 µm.

The negative electrode current collector may also enhance a bonding force of the negative electrode active material when fine irregularities are formed on a surface of the negative electrode current collector. For example, the negative electrode current collector may be used in various forms such as a film, a sheet, foil, a net, a porous body, a foam, a non-woven fabric, and the like.

The negative electrode active material layer includes a negative electrode active material.

The negative electrode active material may include at least one selected from the group consisting of a carbon-based active material and a silicon-based active material.

The silicon-based active material may impart excellent capacity characteristics and durability to the negative electrode for a secondary battery or the secondary battery according to the present invention.

The silicon-based active material may include a compound represented by $SiO_x$ ($0 \leq x < 2$). Because $SiO_2$ may not react with lithium ions so that lithium cannot be stored, x preferably falls within this range. More preferably, the silicon-based active material may be SiO.

An average particle diameter ($D_{50}$) of the silicon-based active material may be in a range of 1 µm to 30 µm, preferably 3 µm to 15 µm, in terms of securing the structural stability of the negative electrode active material during charging and discharging.

The carbon-based active material may impart excellent cycle characteristics or battery lifespan performance to the negative electrode for a secondary battery or the secondary battery according to the present invention.

Specifically, the carbon-based active material may include at least one selected from the group consisting of artificial graphite, natural graphite, hard carbon, soft carbon, carbon black, acetylene black, Ketjen black, Super P, graphene, and fibrous carbon. Preferably, the carbon-based active material may include at least one selected from the group consisting of artificial graphite and natural graphite.

An average particle diameter ($D_{50}$) of the carbon-based active material may be in a range of 5 μm to 35 μm, preferably 12 μm to 25 μm, in terms of securing the structural stability of the negative electrode active material during charging and discharging.

Specifically, it is desirable that both of the silicon-based active material and the carbon-based active material are used in the negative electrode active material in terms of improving the capacity characteristics and the cycle characteristics at the same time. Specifically, it is desirable that the negative electrode active material includes the carbon-based active material and the silicon-based active material at a weight ratio of 50:50 to 95:5, preferably a weight ratio of 60:40 to 80:20. When the weight ratio falls within this range, this is desirable in term of improving the capacity and cycle characteristics at the same time.

The negative electrode active material layer may further include a binder and/or a conductive material along with the negative electrode active material.

The binder is used to improve an adhesive force between the negative electrode active material layer and the negative electrode current collector in order to improve the performance of a battery. For example, the binder may include at least any one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, a propylene polymer, an ethylene-propylene-diene monomer (EPDM), sulfonated EPDM, a styrene butadiene rubber (SBR), a fluorinated rubber, polyacrylic acid, and materials obtained by substituting hydrogen of the aforementioned compounds with Li, Na, Ca, or the like. Also, the binder may include various copolymers thereof.

In the negative electrode active material layer, the binder may be included at 0.5% by weight to 10% by weight, preferably 1% by weight to 5% by weight, based on the total weight of the negative electrode active material layer.

The conductive material is not particularly limited as long as it has conductivity without causing a chemical change in the corresponding battery. For example, graphite such as natural graphite, artificial graphite, or the like; carbon black such as carbon black, acetylene black, Ketjen black, channel black, furnace black, lamp black, thermal black, and the like; conductive fibers such as carbon fibers, metal fibers, or the like; conductive tubes such as carbon nanotubes and the like; metal powders such as fluorocarbon, aluminum, nickel powders, and the like; conductive whiskers such as zinc oxide, potassium titanate, and the like; conductive metal oxides such as titanium oxide and the like; conductive materials such as polyphenylene derivatives, and the like may be used.

In the negative electrode active material layer, the conductive material may be included at 0.5% by weight to 10% by weight, preferably 1% by weight to 5% by weight, based on the total weight of the negative electrode active material layer.

A thickness of the negative electrode active material layer may be in a range of 10 μm to 100 μm, preferably 50 μm to 80 μm.

The method of manufacturing a negative electrode for a secondary battery according to the present invention includes immersing the negative electrode structure in a pre-lithiation solution in which a lithium metal counter electrode is immersed so that the negative electrode structure is spaced apart from the lithium metal counter electrode.

The lithium metal counter electrode may include a lithium metal and may function as a counter electrode for a negative electrode structure during electrochemical charging and discharging, as will be described below.

The lithium metal counter electrode is immersed in the pre-lithiation solution so that the lithium metal counter electrode is spaced apart from the negative electrode structure. Therefore, a short-circuit phenomenon that may occur as the lithium metal counter electrode comes into direct contact with the negative electrode structure during the electrochemical charging and discharging is prevented.

The pre-lithiation solution may include a lithium salt and an organic solvent.

The organic solvent is not particularly limited as long as it can serve as a medium for performing an electrochemical reaction and for movement of ions. Specifically, ester-based solvents such as methyl acetate, ethyl acetate, γ-butyrolactone, ε-caprolactone, and the like; ether-based solvents such as dibutyl ether, tetrahydrofuran, or the like; ketone-based solvents such as cyclohexanone, and the like; aromatic hydrocarbon-based solvents such as benzene, fluorobenzene, and the like; carbonate-based solvents such as dimethyl carbonate (DMC), diethyl carbonate (DEC), ethyl methyl carbonate (EMC), ethylene carbonate (EC), propylene carbonate (PC), and the like; alcohol-based solvents such as ethyl alcohol, isopropyl alcohol, and the like; nitriles such as R-CN (wherein R is a linear, branched, or cyclic C2 to C20 hydrocarbon group, which may include a double-bonded aromatic ring or an ether bond), and the like; amides such as dimethylformamide, and the like; dioxolanes such as 1,3-dioxolane, and the like; or sulfolane, and the like may be used. Among these, the carbonate-based solvents are preferred in terms of improving the electrochemical stability. Specifically, ethyl methyl carbonate (EMC), ethylene carbonate (EC), and the like are more preferred.

The lithium salt may include at least one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, and $LiB(C_2O_4)_2$, and may preferably include $LiPF_6$.

A concentration of the lithium salt may be in a range of 0.1 M to 3 M, preferably 0.5 M to 1.5 M, based on the pre-lithiation solution. When the concentration of the lithium salt falls within this range, the lithium salt may be sufficiently dissolved so that lithium ions can be smoothly intercalated into the active material, which is desirable.

The pre-lithiation solution may further include an additive, which includes at least one selected from the group consisting of fluoroethylene carbonate (FEC), vinylene carbonate (VC), polystyrene (PS), succinonitrile, ethylene glycol bis(propionitrile) ether, and lithium bis(fluorosulfonyl) imide (LiFSI), and preferably includes fluoroethylene carbonate, in terms of stabilizing a surface of the negative electrode active material during the pre-lithiation to smoothly perform the pre-lithiation.

In the pre-lithiation solution, the additive may be included at 0.1% by weight to 15% by weight, preferably 0.5% by weight to 5% by weight, based on the total weight of the pre-lithiation solution, in terms of stabilizing a surface of the negative electrode active material to smoothly perform the pre-lithiation.

The immersion of a cell for pre-lithiation may be performed for 0.5 hours to 15 hours, preferably 2 hours to 5 hours, in terms of stable and uniform pre-lithiation.

The method of manufacturing a negative electrode for a secondary battery according to the present invention includes subjecting the negative electrode structure to a pre-lithiation process, which includes an electrochemical charging process and an electrochemical discharging process performed after the electrochemical charging process, wherein a state of charge ($SOC_p$) of the negative electrode structure subjected to the pre-lithiation process is in a range of 5% to 50%.

The method of manufacturing a negative electrode for a secondary battery according to the present invention further includes subjecting the negative electrode structure to an additional electrochemical discharging process after electrochemically charging the negative electrode structure. The negative electrode structure subjected to such a charging/discharging process may form a more stable and harder passivation film. Also, a passivation film may be sufficiently formed and the irreversible capacity of the negative electrode may be effectively removed, compared to those of the conventional pre-lithiation methods in which the electrochemical charging itself is performed, thereby improving the cycle characteristics of a battery.

A state of charge ($SOC_p$) of the negative electrode structure subjected to the pre-lithiation process may be in a range of 5% to 50%. When the pre-lithiation process is performed in a state in which the state of charge of the negative electrode structure is maintained within this range, a passivation film may be uniformly and stably formed on a surface of the negative electrode structure and the irreversible capacity of the negative electrode may be removed, thereby improving the cycle characteristics of a battery. When the $SOC_p$ is less than 5%, an effect of improving the cycle performance of the battery may be poor because it is difficult to uniformly form a passivation film on a surface of the negative electrode. On the other hand, when the $SOC_p$ is greater than 50%, excessive lithiation may cause lithium to precipitate in the form of a metal during the electrochemical charging of a battery, resulting in degraded cycle performance of the battery.

The $SOC_p$ may be calculated based on the discharge capacity ($SOC_p$ 100%) of the negative electrode structure when the negative electrode structure is charged at a current density of 0.1 C to a voltage of 0.005 V in a CC mode, charged in a CV mode until the current density reaches 0.005 C in a state in which the voltage is maintained at 0.005 V, and then discharged at a current density of 0.1 C to a voltage of 1.5 V in a CC mode.

Specifically, the $SOC_p$ may be preferably in a range of 10% to 30%, more preferably 12% to 25%. When the $SOC_p$ falls within this range, an effect of improving the cycle characteristics of a battery may be maximized.

The $SOC_p$ may be realized by regulating the state of charge (SOC) of the final negative electrode structure while performing the electrochemical charging process and the electrochemical discharging process in the pre-lithiation process. Lithium may be intercalated or deintercalated into/from the negative electrode active material by means of the pre-lithiation process. As described above, because the $SOC_p$ of the negative electrode structure subjected to the pre-lithiation process is in a range of 5% to 50%, lithium ultimately remains in the negative electrode active material.

The lithium may be intercalated into the negative electrode active material and/or onto a surface of the negative electrode active material by the pre-lithiation. The lithium may be intercalated into the negative electrode active material in the form of lithium ions, a lithium compound and/or metal lithium, or may react with the negative electrode active material after the intercalation to form an alloy.

The electrochemical charging and the electrochemical discharging may be performed using an electrochemical charger/discharger. Specifically, WOCS3000s (manufactured by WonA Tech Co., Ltd.) may be used as the electrochemical charger/discharger.

Lithium may be intercalated into the negative electrode structure or the negative electrode active material by means of the electrochemical charging process. Therefore, because a passivation film may be formed to a certain extent on a surface of the negative electrode and the negative electrode may undergo side reactions which may occur on a surface of the negative electrode in advance, the occurrence of the side reactions may be prevented when the negative electrode manufactured after the pre-lithiation process is, in effect, applied to batteries.

A state of charge ($SOC_c$) of the negative electrode structure after the electrochemical charging process may be in a range of 25% to 100%, preferably 45% to 100%, more preferably 65% to 100%, and even more preferably 85% to 100%. When the $SOC_c$ of the negative electrode structure falls within this range, a passivation film may be sufficiently formed on a surface of the negative electrode using the electrochemical charging process, thereby improving the cycle characteristics of a battery.

The $SOC_c$ may be calculated based on the charge capacity ($SOC_c$ 100%) of the negative electrode structure when the negative electrode structure is charged at a current density of 0.1 C to a voltage of 0.005 V in a CC mode, and then charged in a CV mode until the current density reaches 0.005 C in a state in which the voltage is maintained at 0.005 V.

When the electrochemical discharging process is performed, some of the lithium intercalated during the electrochemical charging process may be deintercalated from the negative electrode structure or the negative electrode active material. According to the present invention, a passivation film may be more firmly formed, compared to the conventional electrochemical pre-lithiation, because another passivation film is additionally formed on a surface of the negative electrode structure by application of an oxidation current when the electrochemical discharging process is further performed.

The pre-lithiation process may further include a first intermission process performed between the electrochemical charging process and the electrochemical discharging process. In this case, the lithium that may be present in the negative electrode may be uniformly distributed in the negative electrode by means of the first intermission process, and the passivation film may be stabilized, which is desirable.

The first intermission process may be performed for 10 minutes to 180 minutes, preferably 20 minutes to 60 minutes. In this case, the passivation film may be stably formed, which is desirable.

When the pre-lithiation process consists of the electrochemical charging process and the electrochemical discharging process, or consists of the electrochemical charging process, the first intermission process, and the electrochemical discharging process, a state of charge ($SOC_d$) of the negative electrode structure after the electrochemical discharging process may be the same as the $SOC_p$. Therefore, the $SOC_d$ may be in a range of 5% to 50%, preferably 10% to 30%, and more preferably 12% to 25%.

The pre-lithiation process may further include an electrochemical recharging process performed after the electrochemical discharging process. Therefore, lithium may be re-intercalated into the negative electrode or the negative electrode active material so that an additional passivation film can be more firmly formed on a surface of the negative electrode, thereby further improving the cycle characteristics of a battery. Specifically, fine cracks may be generated at the negative electrode active material while the negative electrode is charged and discharged during the pre-lithiation process. In this case, a passivation film may also be formed on a surface of the negative electrode active material, which has been exposed due to the fine cracks, during the recharging process, which makes it possible to further improve the cycle characteristics of a battery.

When the electrochemical recharging process is further performed in the pre-lithiation process, a state of charge ($SOC_p$) of the negative electrode structure may be adjusted to be in a range of 5% to 50%, preferably 10% to 30%, and more preferably 12% to 25%.

When the pre-lithiation process includes an electrochemical recharging process, the state of charge ($SOC_d$) of the negative electrode structure after the electrochemical discharging process may be less than 50%. Specifically, when the pre-lithiation process further includes an electrochemical recharging process, the state of charge ($SOC_d$) of the negative electrode structure after the electrochemical discharging process may be preferably less than or equal to 25%, and may be more preferably 0% (fully discharged). As a result, a passivation film may be formed by application of an oxidation current while the negative electrode structure is discharged to a proper extent. When the negative electrode is recharged, an additional passivation film may be expected to be formed in fine cracks of the negative electrode active material. Therefore, the passivation film may be more firmly formed on a surface of the negative electrode, thereby improving the cycle characteristics of a battery The pre-lithiation process may further include a second intermission process performed between the electrochemical discharging process and the electrochemical recharging process. In this case, the lithium that may be present in the negative electrode may be uniformly distributed in the negative electrode by means of the second intermission process, and the passivation film may be stabilized, which is desirable.

The second intermission process may be performed for 10 minutes to 180 minutes, preferably 20 minutes to 60 minutes. In this case, the passivation film may be stably formed, which is desirable.

In the pre-lithiation process, the electrochemical charging process, the electrochemical discharging process and/or the electrochemical recharging process may be each independently performed at a current density of 0.5 mA/cm² to 3 mA/cm², preferably a current density of 0.8 mA/cm² to 2 mA/cm². In this case, the negative electrode active material may be stably and uniformly subjected to the pre-lithiation.

In the pre-lithiation process, the electrochemical charging process, the electrochemical discharging process and/or the electrochemical recharging process may be performed at 10° C. to 70° C., preferably 20° C. to 40° C. At this temperature, the negative electrode structure may be stably charged and discharged to form a uniform passivation film, which is desirable in term of preventing damage of the negative electrode structure according to the charging and discharging.

The negative electrode structure subjected to the pre-lithiation process may be used as a negative electrode of a secondary battery, more specifically a lithium secondary battery, and a stable and hard passivation film may be formed to a proper extent on a surface of the negative electrode, thereby improving the cycle performance of a battery to a comparable extent.

The negative electrode manufactured by the method of manufacturing a negative electrode for a secondary battery according to the present invention may be preferably applied to a secondary battery, specifically a lithium secondary battery.

The secondary battery may include the negative electrode for a secondary battery manufactured by the aforementioned method of manufacturing a negative electrode for a secondary battery; a positive electrode facing the negative electrode for a secondary battery; a separator interposed between the negative electrode for a secondary battery and the positive electrode; and an electrolyte. The negative electrode for a secondary battery is as described above, and the positive electrode, the separator, and the electrolyte may be used without limitation as long as they are used in conventional lithium secondary batteries.

The secondary battery is useful in the fields of portable devices such as cellular phones, laptop computers, digital cameras, and the like, and electric vehicles such as hybrid electric vehicle (HEV), and the like.

Also, the secondary battery may be applied to battery modules including the secondary battery as a unit cell, or battery packs including the same.

The battery modules or the battery packs may be used as a power sources for any one or more medium and large devices among a power tool; an electric car including an electric vehicle (EV), a hybrid electric vehicle, and a plug-in hybrid electric vehicle (PHEV); or a power storage system.

Hereinafter, exemplary embodiments of the present invention will be described in detail so that a person having ordinary skill in the art to which the present invention belongs can easily put the invention into practice. However, it should be understood that the present invention may be embodied in various forms and is not intended to limit Examples described herein.

EXAMPLES

Example 1: Manufacture of Negative Electrode for Secondary Battery

Manufacture of Negative Electrode Structure

A mixture obtained by mixing natural graphite (average particle diameter ($D_{50}$): 20 μm) and SiO (average particle diameter ($D_{50}$): 5 μm) at a weight ratio of 70:30 was prepared as a negative electrode active material.

The negative electrode active material, Denka black as a conductive material, styrene butadiene rubber (SBR) as a binder, and carboxymethyl cellulose as a thickening agent were mixed at a weight ratio of 92:3:3.5:1.5 to prepare a negative electrode slurry.

One surface of a copper negative electrode current collector (thickness: 8 μm) was coated with the negative electrode slurry, roll-pressed, and dried at 130° C. for 12 hours in a vacuum oven to form a negative electrode active material layer (thickness: 70 μm) on a surface of the copper negative electrode current collector. Thereafter, the negative electrode active material layer formed on the copper negative electrode current collector was cut into pieces with a size of 10 cm×10 cm to form negative electrode structures.

Pre-Lithiation Process

A pre-lithiation solution, which was obtained by adding $LiPF_6$ as a lithium salt at a concentration of 1 M to an organic solvent in which ethylene carbonate (EC) and ethyl methyl carbonate (EMC) were mixed at a volume ratio of 30:70 and adding 2% by weight of fluoroethylene carbonate (FEC) as an additive based on the total weight of the pre-lithiation solution, was prepared. The negative electrode structure was immersed in the pre-lithiation solution for 3 hours.

A lithium metal counter electrode was immersed in the pre-lithiation solution so that the lithium metal counter electrode was spaced apart a predetermined distance from the negative electrode structure.

Next, the negative electrode structure was subjected to a pre-lithiation process. The pre-lithiation process was performed at 25° C. Specifically, the pre-lithiation process was performed by 1) subjecting the negative electrode structure to an electrochemical charging process at a current density of 1 mA/cm$^2$ so that the SOC$_c$ of the negative electrode structure was 100%, 2) performing a first intermission process for 30 minutes, 3) subjecting the negative electrode structure to an electrochemical discharging process at a current density of 1 mA/cm$^2$ so that the SOC$_d$ of the negative electrode structure was 0%, 4) performing a second intermission process for 30 minutes, and 5) electrochemically recharging the negative electrode structure at a current density of 1 mA/cm$^2$.

The SOC$_p$ of the negative electrode structure subjected to the pre-lithiation process was 20%.

The negative electrode structure was washed with an ethyl methyl carbonate solvent, and dried at room temperature to manufacture a negative electrode for a secondary battery of Example 1.

Example 2: Manufacture of Negative Electrode for Secondary Battery

A negative electrode for a secondary battery (SOC$_p$: 20%) of Example 2 was manufactured in the same manner as in Example 1, except that, in the pre-lithiation process, the negative electrode structure was electrochemically charged at a current density of 1 mA/cm$^2$ so that the SOC$_c$ of the negative electrode structure was 80%.

Example 3: Manufacture of Negative Electrode for Secondary Battery

A negative electrode for a secondary battery (SOC$_p$: 20%) of Example 3 was manufactured in the same manner as in Example 1, except that, in the pre-lithiation process, the negative electrode structure was electrochemically charged at a current density of 1 mA/cm$^2$ so that the SOC$_c$ of the negative electrode structure was 50%.

Example 4: Manufacture of Negative Electrode for Secondary Battery

A negative electrode for a secondary battery (SOC$_p$: 20%) of Example 4 was manufactured in the same manner as in Example 1, except that, in the pre-lithiation process, the negative electrode structure was electrochemically charged at a current density of 1 mA/cm$^2$ so that the SOC$_c$ of the negative electrode structure was 30%.

Example 5: Manufacture of Negative Electrode for Secondary Battery

A negative electrode for a secondary battery of Example 5 was manufactured in the same manner as in Example 1, except that, in the pre-lithiation process, 1) the negative electrode structure was subjected to an electrochemical charging process at a current density of 1 mA/cm$^2$ so that the SOC$_c$ of the negative electrode structure was 100%, 2) a first intermission process was performed for 30 minutes, 3) the negative electrode structure was subjected to an electrochemical discharging process at a current density of 1 mA/cm$^2$ so that the SOC$_d$ of the negative electrode structure was 20%, and 4) a second intermission process and an electrochemical recharging process were not performed. The SOC$_p$ of the negative electrode structure subjected to the pre-lithiation process was 20%, which was the same as the SOC$_d$ of the negative electrode structure.

Comparative Example 1: Manufacture of Negative Electrode for Secondary Battery A negative electrode for a secondary battery of Comparative Example 1 was manufactured in the same manner as in Example 1, except that, in the pre-lithiation process, (1) the negative electrode structure was subjected to an electrochemical charging process at a current density of 1 mA/cm$^2$ so that the SOC$_c$ of the negative electrode structure was 20%, and (2) a first intermission process, an electrochemical discharging process, a second intermission process, and an electrochemical recharging process were not performed.

Comparative Example 2: Manufacture of Negative Electrode for Secondary Battery A negative electrode for a secondary battery of Comparative Example 2 was manufactured without subjecting the negative electrode structure manufactured in Example 1 to a separate pre-lithiation process.

Experimental Example 1: Evaluation of Capacity Retention Rate

Manufacture of Lithium Secondary Battery

An aluminum current collector was coated with a positive electrode slurry, which was obtained by mixing LiCoO$_2$ as a positive electrode active material, Super C as a conductive material, and PVdF as a binder at a weight ratio of 97:1.5:1.5, roll-pressed, and dried at 130° C. to manufacture a positive electrode.

A propylene polymer separator was interposed between each of the negative electrodes for a secondary battery manufactured in Examples 1 to 5 and Comparative Examples 1 and 2 and the positive electrode thus manufactured, and an electrolyte was injected thereto to manufacture a lithium secondary battery. A pre-lithiation solution, which was obtained by adding LiPF$_6$ as the lithium salt at a concentration of 1 M to an organic solvent in which ethylene carbonate (EC) and ethyl methyl carbonate (EMC) were mixed at a volume ratio of 30:70 and adding 2% by weight of fluoroethylene carbonate (FEC) as the additive based on the total weight of the pre-lithiation solution, was used as the electrolyte.

Evaluation of Capacity Retention Rate

Discharge capacities and capacity retention rates of the lithium secondary batteries manufactured in Examples and Comparative Examples were evaluated using an electrochemical charger/discharger. The lithium secondary batteries were charged by applying a current at a current density of 0.1 C-rate to a voltage of 4.35 V during charging, and discharged at the same current density to a voltage of 3.5 V during discharging.

The capacity retention rate was evaluated by measuring a discharge capacity of each of the lithium secondary batteries of Examples and Comparative Examples at $1^{st}$ and $100^{th}$ cycles, and calculated by the following Equation 1. The results are listed in the following Table 1.

Capacity Retention Rate (%)={(Discharge Capacity at $100^{th}$ Cycle)/(Discharge Capacity at $1^{st}$ Cycle)}×100 [Equation 1]

TABLE 1

|  | Capacity Retention Rate (%) at $100^{th}$ Cycle |
|---|---|
| Example 1 | 94 |
| Example 2 | 93 |
| Example 3 | 91 |
| Example 4 | 90 |
| Example 5 | 89 |
| Comparative Example 1 | 83 |
| Comparative Example 2 | 72 |

Referring to Table 1, it can be seen that the capacity retention rates of the negative electrodes for a secondary battery of Examples, which had been subjected to the pre-lithiation process including the electrochemical charging process and the electrochemical discharging process, were improved to comparable extent, compared to those of Comparatives Examples, because a harder passivation film was formed on a surface of the negative electrode and the initial irreversible capacity was removed to a comparable extent.

Experimental Example 2: Evaluation of Rate of Increase in Cell Thickness

The rate of increase in cell thickness was evaluated by measuring a thickness of each of the lithium secondary batteries of Examples and Comparative Examples after the lithium secondary batteries were charged at $1^{st}$ and $100^{th}$ cycles, and calculated by the following Equation 2. The results are listed in the following Table 2.

Rate of Increase in Cell Thickness (%)={(Thickness of Lithium Secondary Battery after Charging at $100^{th}$ Cycle−Thickness of Lithium Secondary Battery after Charging at $1^{st}$ Cycle)/(Thickness of Lithium Secondary Battery after Charging at $1^{st}$ Cycle)}×100 [Equation 2]

TABLE 2

|  | Rate of Increase in Cell Thickness (%) |
|---|---|
| Example 1 | 5.1 |
| Example 2 | 6.3 |
| Example 3 | 6.7 |
| Example 4 | 8.1 |
| Example 5 | 9.2 |
| Comparative Example 1 | 21.2 |
| Comparative Example 2 | 27.3 |

Referring to Table 2, because a harder passivation film was able to be formed on a surface of the negative electrode in the case of the negative electrodes for a secondary battery of Examples which had been subjected to the pre-lithiation process including the electrochemical charging process and the electrochemical discharging process, few side reactions occurred during cycle charging and discharging of a cell, thereby preventing the generation of gas. Therefore, it can be seen that the rates of increase in cell thickness of the negative electrodes for a secondary battery of Examples were lowered to a comparable extent, compared to those of Comparative Examples.

The invention claimed is:

1. A method of manufacturing a negative electrode for a secondary battery, comprising:
   forming a negative electrode structure comprising a negative electrode current collector and a negative electrode active material layer formed on a surface of the negative electrode current collector;
   providing a pre-lithiation solution in which a lithium metal counter electrode is immersed and immersing the negative electrode structure in the pre-lithiation solution so that the negative electrode structure is spaced apart from the lithium metal counter electrode; and
   subjecting the negative electrode structure to a pre-lithiation process, which comprises an electrochemical charging process and an electrochemical discharging process performed after the electrochemical charging process,
   wherein a state of charge of the negative electrode structure after the pre-lithiation process ($SOC_p$) is in a range of 5% to 50%.

2. The method of claim 1, wherein a state of charge ($SOC_c$) of the negative electrode structure after the electrochemical charging process is in a range of 25% to 100%.

3. The method of claim 1, wherein the pre-lithiation process further comprises a first intermission process performed between the electrochemical charging process and the electrochemical discharging process.

4. The method of claim 1, wherein the pre-lithiation process further comprises an electrochemical recharging process performed after the electrochemical discharging process.

5. The method of claim 4, wherein a state of charge ($SOC_d$) of the negative electrode structure after the electrochemical discharging process is less than 50%.

6. The method of claim 4, wherein the pre-lithiation process further comprises a second intermission process performed between the electrochemical discharging process and the electrochemical recharging process.

7. The method of claim 1, wherein the negative electrode active material layer comprises a negative electrode active material, wherein the negative electrode active material comprises at least one selected from the group consisting of a carbon-based active material and a silicon-based active material.

8. The method of claim 7, wherein the negative electrode active material comprises the carbon-based active material and the silicon-based active material at a weight ratio of 50:50 to 95:5.

9. The method of claim 1, wherein the pre-lithiation solution comprises a lithium salt and an organic solvent.

10. The method of claim 1, wherein the electrochemical charging process and the electrochemical discharging process are each independently performed at a current density of 0.5 mA/cm² to 3 mA/cm².

* * * * *